United States Patent [19]
Saha

[11] Patent Number: 4,696,534
[45] Date of Patent: Sep. 29, 1987

[54] APPARATUS FOR EXTRACTING LIGHT FROM THE CORE OF AN OPTICAL FIBRE THROUGH THE CLADDING AND BUFFER COATING THEREOF AND ITS USE IN OPTICAL FIBRE SPLICING

[75] Inventor: Sanjiv Saha, London, England

[73] Assignee: BICC Public Limited Company, London, England

[21] Appl. No.: 760,675

[22] Filed: Jul. 30, 1985

[30] Foreign Application Priority Data

Aug. 8, 1984 [GB] United Kingdom ............... 8420135

[51] Int. Cl.⁴ ........................... G02B 6/26; G02B 6/38
[52] U.S. Cl. ............................... 350/96.15; 350/96.21
[58] Field of Search ................... 350/96.15, 96.21; 250/227; 356/73.1

[56] References Cited

U.S. PATENT DOCUMENTS 4,618,212 10/1986 Ludington et al. ............. 350/96.15

FOREIGN PATENT DOCUMENTS 3429947 2/1986 Fed. Rep. of Germany ... 350/96.15

Primary Examiner—Eugene R. Laroche
Assistant Examiner—James C. Lee
Attorney, Agent, or Firm—Anthony J. Casella; Gerald E. Hespos

[57] ABSTRACT

Apparatus for locally abstracting light from the core of a buffer coated optical fibre, especially a buffer coated single mode optical fibre, suitable for use when monitoring the fusion splicing of optical fibres comprises a body of perspex having at least three faces, an arcuate contact face adapted to bear against a smoothly curved length of buffer coated optical fibre, an exit face through which light entering the body through the contact face can emerge and a reflecting face which will reflect light entering the body through the contact face in a direction towards the exit face. Light emerging from the smoothly curved length of buffer coated optical fibre and passing through the contact face into the body will be directed and reflected towards the exit face from where it can pass into a light detector.

13 Claims, 2 Drawing Figures

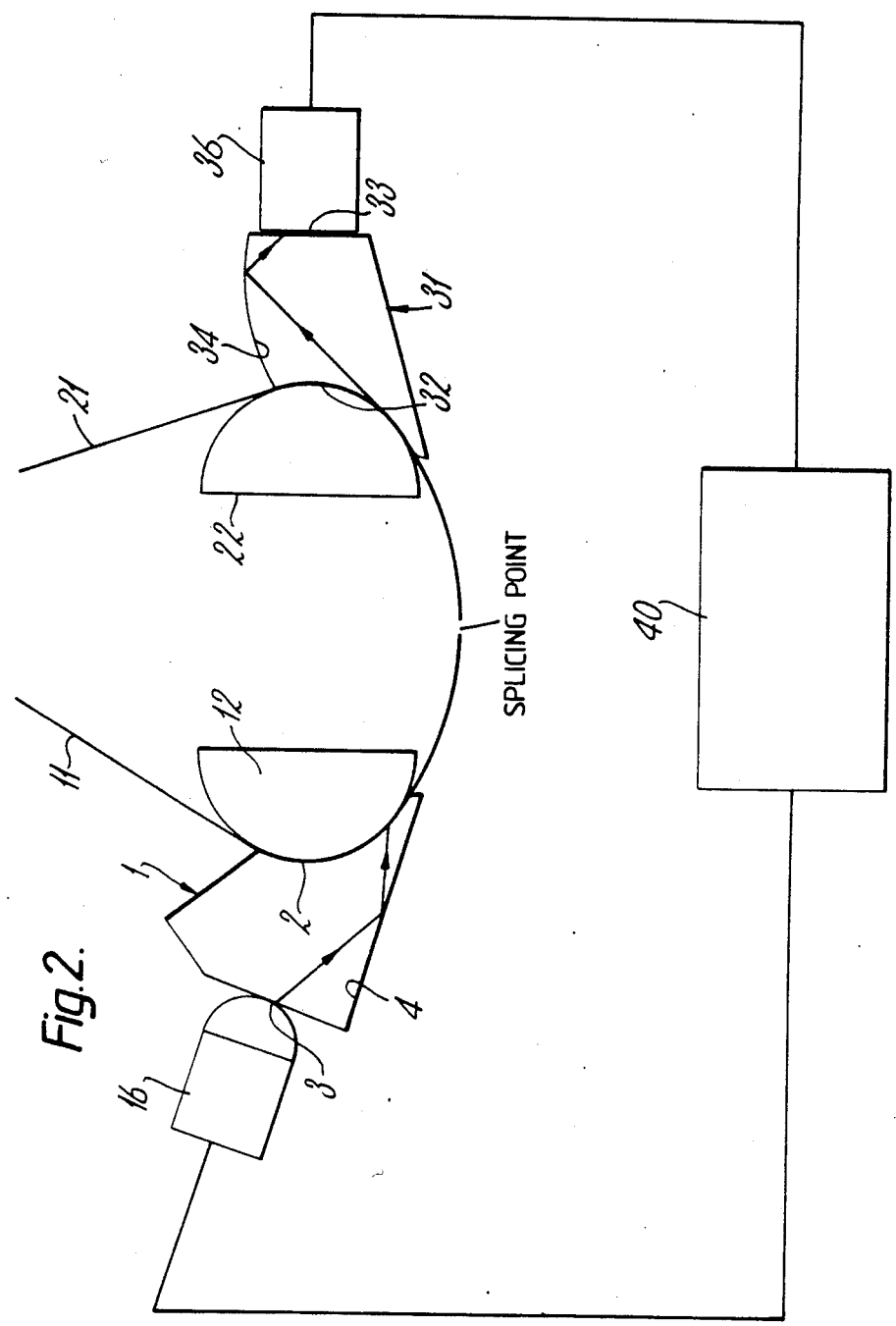

APPARATUS FOR EXTRACTING LIGHT FROM THE CORE OF AN OPTICAL FIBRE THROUGH THE CLADDING AND BUFFER COATING THEREOF AND ITS USE IN OPTICAL FIBRE SPLICING

This application is related to co-pending U.S. patent application Ser. No. 760,681.

This invention relates to effecting a permanent end-to-end splice between two optical fibres, one or each of which may be a component of an optical cable. The abutting ends of two optical fibres to be spliced usually are permanently secured together by fusion or by an index-matching adhesive.

In effecting both of these methods of splicing optical fibres, before the two optical fibres are permanently secured together it is necessary to ensure that the cores of the optical fibres are axially aligned for optimum transfer of light from one fibre to the other. Axial alignment of the two optical fibres is especially critical in the case of single mode optical fibres where the diameter of the core is substantially less than the overall diameter of the optical fibre.

Two methods of obtaining optimum axial alignment of two optical fibres are currently favoured. In the first of these, light is injected into one of the optical fibres either at the end remote from the proposed splice or into a part of the optical fibre which is adjacent to the proposed splice and from which the buffer coating on the fibre, i.e. a coating of relatively soft polymeric material which overlies and protects the glass surface of the optical fibre from mechanical damage, reduces microbending loss and enables the fibre to be bent into and maintained in a bend of substantially smaller radius than would otherwise have been possible, has been removed and the amount of light passing into the cladding of the other optical fibre at the abutting ends of the optical fibres is continuously monitored. One or each of the optical fibres is moved transversely with respect to the other until the monitored light is a minimum, thereby indicating the fibres are appropriately axially aligned, and the splice is then effected. In the second of these methods, light is injected into one of the optical fibres either at the end remote from the proposed splice or into a part of the optical fibre which is adjacent the proposed splice and from which the buffer coating has been removed and the light transferred into the other optical fibre is continuously monitored at the end of the other optical fibre remote from the proposed splice or at a position in the other optical fibre adjacent the proposed splice. One or each of the optical fibres is moved transversely with respect to the other until the light extracted from the other optical fibre either at its remote end or at said position adjacent the proposed splice is a maximum, thereby indicating the fibres are appropriately axially aligned, and the splice is then effected.

Ideally, to keep the number of operators necessary to operate the method to a minimum, light is injected into the first optical fibre at a position adjacent the proposed splice and, in the first case, light scatter from the abutting ends of the optical fibres is continuously monitored or, in the second case, light emerging from the other optical fibre at a position adjacent the proposed splice is continuously monitored.

Whilst there is no difficulty in extracting light from an optical fibre adjacent the proposed splice if the buffer coating on the optical fibre at that position is removed, we have found that it is difficult to extract and intercept with a photo-detector sufficient light from the core of the optical fibre at a position adjacent the proposed splice if the buffer coating is not removed; this difficulty is amplified where the optical fibre is a single mode optical fibre with a core of a relatively small diameter.

It is an object of the present invention to provide an improved apparatus for and method of extracting light from the core of an optical fibre through the cladding and buffer coating thereof.

According to the invention, the improved apparatus comprises a body which is made of a substantially rigid transparent material and which has at least three faces, a first or contact face which is of substantially arcuate shape and which is adapted to bear against a smoothly curved length of buffer coated optical fibre, a second or exit face through which light emerging from the optical fibre and into the body can pass and a third or reflecting face which is of substantially arcuate shape and which will reflect light entering the body through said contact face in a direction towards said exit face, the shapes of said contact, reflecting and exit faces and the positions of the reflecting and exit faces relative to the contact face being such that at least a major proportion of light passing from the core of a smoothly curved length of buffer coated optical fibre against which said body bears through the cladding and buffer coating of the optical fibre and through the smoothly curved contact face into the body will be directed and reflected towards said exit face from where it can pass into a light detector.

For a buffer-coated optical fibre having an overall diameter of 250 um, preferably the smoothly curved contact face of the substantially rigid body has a radius of curvature in the range 3 to 10 mm; a preferred radius of curvature is 4.5 mm. In this case preferably, also, the smoothly curved contact face is of such an arcuate length that it subtends an angle at its centre of curvature lying within the range 60° to 120°; where the radius of curvature of the smoothly curved contact face is 4.5 mm, preferably the smoothly curved contact face subtends an angle at its centre of curvature in the range 80° to 90°.

Since the reflecting face is of smoothly curved arcuate shape, substantially all the tangential rays passing through the smoothly curved contact face are reflected towards the exit face. Where the smoothly curved contact face of the substantially rigid body has a radius of curvature in the range 3 to 10 mm and subtends an angle at its centre of curvature lying within the range 60° to 120°, preferably, the smoothly curved reflecting face has a radius of curvature in the range 5 to 10 mm and subtends an angle at its centre of curvature lying within the range 50° to 60°.

The smoothly curved contact and reflecting faces preferably are contiguous the one with the other.

The exit face preferably is of substantially planar form and, preferably also, in contiguous with the reflecting face.

The substantially rigid body is preferably made of perspex or other substantially rigid transparent plastics material and, as a consequence, is inexpensive.

A major advantage of the apparatus of the present invention lies in the face that, because it is so efficient in focussing at least a major proportion of the light entering the substantially rigid body from a buffer coated optical fibre towards its exit surface, it operates efficiently where the light detector is an inexpensive light detecting device, such as a photodetector. The apparatus of the present invention is especially suitable for use with a light detector incorporating a recessed chip.

The invention further includes a method of effecting local extraction of light from a buffer coated optical fibre using the improved apparatus hereinbefore described, which method comprises effecting a smooth curve in a part of the length of the buffer coated optical fibre and placing the smoothly curved contact face of the substantially rigid body of the improved apparatus into facial contact with the smoothly curved length of optical fibre so that the optical fibre and the smoothly curved contact face are in interfacial contact throughout the length of the smoothly curved contact face, and directing light passing from the core of the optical fibre through the cladding and buffer coating of the optical fibre and and through the smoothly curved contact face of the substantially rigid body into the body towards said exit face and also towards said reflecting face from where it is deflected towards said exit face, and through said exit face to a light detecting device.

Preferably, the buffered optical fibre approaching the smoothly curved contact face of the substantially rigid body extends from the proposed splice in a substantially rectilinear direction.

The apparatus and method of the present invention is especially suitable for use for extracting light from the core of a single mode optical fibre which is to be spliced to another single mode optical fibre.

The invention is further illustrated by a description, by way of example, of preferred apparatus for extracting light from the core of a buffer coated optical fibre, and of a preferred method of effecting a permanent end-to-end splice between two buffer coated optical fibres, with reference to the accompanying drawings, in which:

FIG. 2 is a schematic representation of the apparatus employed in the preferred method of effecting a permanent end-to-end splice between two buffer coated optical fibres.

Figure 1:
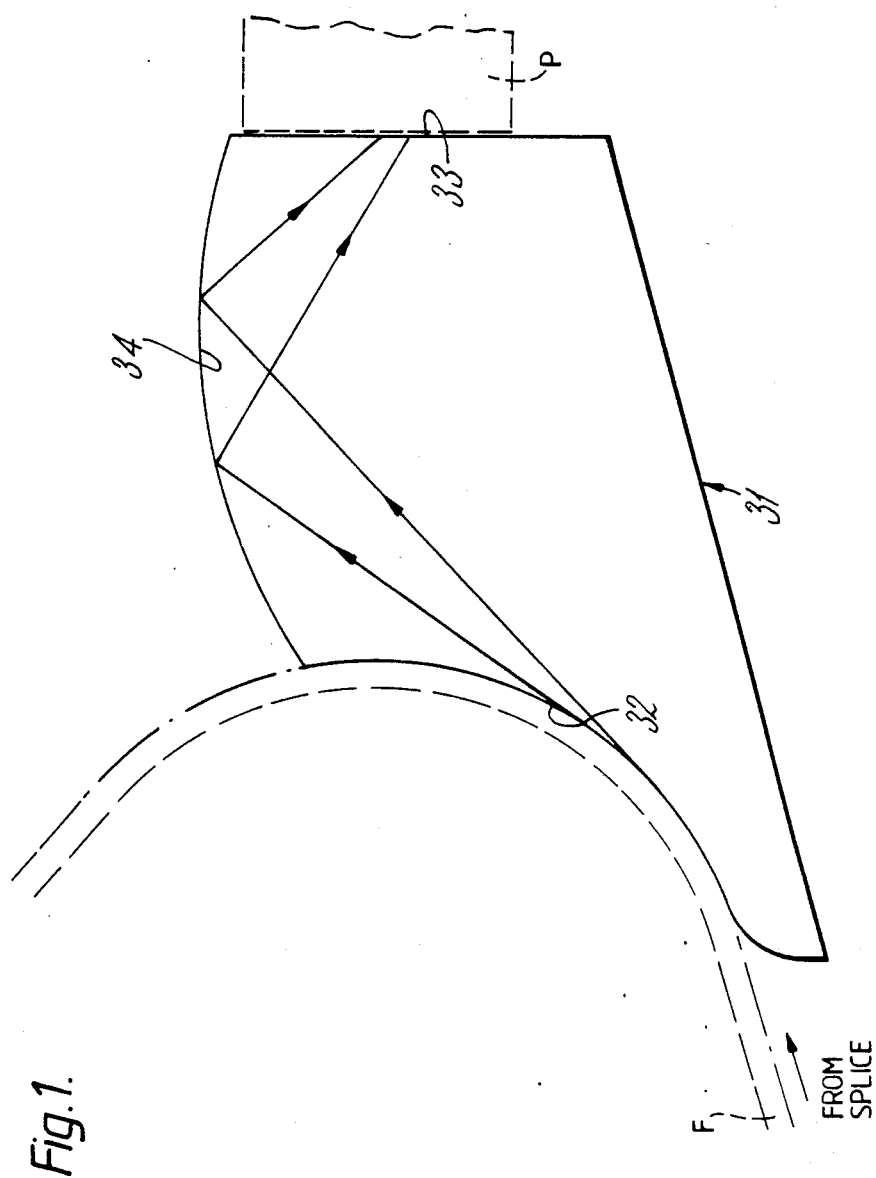
FIG. 1 is a sectional side view of the preferred apparatus.

Referring to FIG. 1, the preferred apparatus for locally extracting light from the core of a buffer coated optical fibre F comprises a substantially rigid transparent body 31 of perspex. The perspex body 31 has a contact face 32 which is of arcuate shape and which is adapted to bear against a smoothly curved length of the buffer coated optical fibre F, an exit face 33 which is of planar form and through which light emerging from the optical fibre and into the body can pass, and a reflecting face 34 which is of smoothly curved arcuate form, which is contiguous with the exit face 33 and which will reflect light entering the body through the contact face 32 in a direction towards the exit face. The contact face 32 has a radius of curvature of 4.5 mm and subtends an angle at its central of curvature of 85°; the reflecting face 34 has a radus of curvature of 6.7 mm and subtends an angle at its central of curvature of 55°. The shapes of the contact face 32, reflecting face 34 and exit face 33 and the positions of the reflecting and exit faces relative to the contact face are such that at least a major proportion of light passing from the core of a smoothly curved length of buffer coated optical fibre against which the body 1 bears, through the cladding and buffer coating of the optical fibre and through the smoothly curved contact face 32 into the body will be directed and reflected towards the exit face 33 from where it can pass into a light detector P.

In the preferred method of effecting an end-to-end splice between two buffer coated optical fibres, the buffer coating is locally removed from each optical fibre 11, 21 over a short length of the fibre immediately adjacent to the end to be spliced and a length of buffer coated optical fibre 11 is laid around the smoothly curved convex surface of an anvil 12 and a length of a buffer coated optical fibre 21 is laid around the smoothly curved convex surface of an anvil 22, the convex surfaces of the anvils each having a radius of curvature of 4.5 mm.

A rigid body 1 of perspex is positioned immediately adjacent to the smoothly curved length of buffer coated optical fibre 11 so that an arcuate contact face 2 on the body bears against the smoothly curved length of buffer coated optical fibre. The rigid body 1 is suitable for injecting light into the core of the optical fibre 11 through the cladding and buffer coating thereof and is the subject of my co-pending U.S. patent application Ser. No. 760,681 filed on the same day as the present application. In addition to the arcuate contact face 2, the body 1 has an entry face 3 through which light from a light source can pass and a planar reflecting face 4 which will reflect light entering the body through the entry face in a direction towards the contact face. The inclinations or the entry face 3, the reflecting face 4 and the contact face 2 relative to one another are such that at least a major proportion of light injected through the entry face into the body 1 will be directed or reflected towards a part of the length of said smoothly curved contact face from where it will pass through the buffer coating and cladding of the optical fibre 11 against which the body bears into the core of the optical fibre. A rigid body 31 of perspex as illustrated in FIG. 1 is positioned immediately adjacent the smoothly curved length of buffer coated optical fibre 21 so that the arcuate contact face 32 on the body bears against the smoothly curved length of buffer coated optical fibre 21. A light source 16 is positioned adjacent the body 1 and a photo diode or other light detector 36 is positioned adjacent the body 31.

With the ends of the optical fibres 11, 21 from which the buffer coatings have been removed so arranged that they substantially abut with their cores and approximately axial alignment, light from the light source 16 is injected through the entry face 3 of the body 1 into the body and is directed and reflected into the body towards the contact face 2 from where it passes through the buffer coating and cladding of the smoothly curved length of buffer coated optical fibre 11 into the core of the optical fibre. A proportion of light from the core of the optical fibre 11 passes into the core of the optical fibre 21. Light from the core of the smoothly curved length of buffer coated optical fibre 21 passes through the cladding and buffer coating of the optical fibre and through the contact 32 of the body 31 into the body and is directed or reflected in the body towards the exit face 33 from where it passes into the photo diode or other light detector 36. One or each of the optical fibres 11, 21 is moved transversely with respect of the other until the light locally extracted from the optical fibre 21 is a maximum, thereby indicating that the cores of the fibres are appropriately axially aligned, and the splice is then effected.

Axial alignment of the cores of the optical fibres for optimum transfer of light from one fibre to the other using the apparatus and method hereinbefore described and fusion splicing of the aligned optical fibres can be effected automatically by means of equipment 40 associated with the light injection and detection apparatus.

What I claim as my invention is:

1. Apparatus for extracting light from the core of an optical fibre through the cladding and buffer coating thereof, which apparatus comprises a body which is made of a substantially rigid transparent material and which has at least three faces, a contact face which is of substantially arcuate shape and which is adapted to bear against a smoothly curved length of buffer coated optical fibre, an exit face through which light emerging from the optical fibre and into the body can pass and a reflecting face which is of substantially arcuate shape and which will reflect light entering the body through said contact face in a direction towards said exit face, the shapes of said contact, reflecting and exit faces and the positions of the reflecting and exit faces relative to the contact face being such that at least a major proportion of light passing from the core of a smoothly curved length of buffer coated optical fibre against which said body bears, through the cladding and buffer coating of the optical fibre and through the smoothly curved contact face into the body will be directed and reflected towards said exit face from where it can pass into a light detector.

2. Apparatus as claimed in claim 1, wherein the smoothly curved contact face of the substantially rigid body has a radius of curvature in the range of 3 to 10 mm.

3. Apparatus as claimed in claim 1, wherein the smoothly curved contact face is of such an arcuate length that it subtends an angle at its centre of curvature lying within the range of 60° to 120°.

4. Apparatus as claimed in claim 1, wherein the smoothly curved contact face of the substantially rigid body has a radius of curvature of 4.5 mm.

5. Apparatus as claimed in claim 4, wherein the smoothly curved contact face subtends an angle at its centre of curvature in the range 80° to 90°.

6. Apparatus as claimed in claim 1, wherein the reflecting face has a radius of curvature in the range 5 to 10 mm and subtends an angle at its centre of curvature lying within the range 50° to 60°.

7. Apparatus as claimed in claim 1, wherein the smoothly curved contact and reflecting faces are contiguous one with the other.

8. Apparatus as claimed in claim 1, wherein the exit face is of substantially planar form.

9. Apparatus as claimed in claim 8, wherein the exit face is contiguous with the reflecting face.

10. Apparatus as claimed in claim 1, wherein the substantially rigid body is made of substantially rigid transparent plastics material.

11. Apparatus as claimed in claim 2, wherein the smoothly curved contact base is of such an arcuate length that it subtends an angle at its centre of curvature lying within the range of 60° to 120°.

12. A method of effecting local extraction of light from a buffer coated optical fibre, which method comprises effecting a smooth curve in a part of the length of the buffer coated optical fibre and placing into facial contact with the smoothly curved length of optical fibre a smoothly curved contact face of a body made of a substantially rigid transparent material so that the optical fibre and the smoothly curved contact face are in interfacial contact throughout the length of the smoothly curved contact face, which contact face is one of at least three faces of said body including said contact face, an exit face through which light emerging from the optical fibre and into the body can pass and a reflecting face which is of substantially arcuate shape and which will reflect light entering the body through said contact face in a direction towards said exit face, and directing light passing from the core of the optical fibre through the cladding and buffer coating of the optical fibre and through the smoothly curved contact face of the substantially rigid body into the body towards said exit face, and also towards said reflecting face from where it is reflected towards said exit face, and through said exit face to a light detecting device.

13. A method of effecting a permanent end-to-end splice between two buffer coated optical fibres which comprises arranging the two optical fibres in approximately axial alignment with their neighbouring end faces substantially abutting; locally injecting light into a smoothly curved length of one of the buffer coated optical fibres adjacent to the proposed splice; effecting a smooth curve in a part of the length of the other buffer coated optical fibre at a position adjacent the proposed splice by placing into facial contact with the smoothly curved length of optical fibre a smoothly curved contact face of a body made of a substantially rigid transparent material so that the optical fibre and the smoothly curved contact face are in interfacial contact throughout the length of the smoothly curved contact face, which contact face is one of at least three faces of the body including said contact face, an exit face through which light emerging from the optical fibre and into the body can pass and a reflecting face which is of substantially arcuate shape and which will reflect light entering the body through said contact face in a direction towards said exit face; directing light passing from the core of the optical fibre through the cladding and buffer coating of the optical fibre and through the smoothly curved contact face of the substantially rigid body into the body towards said exit face, and also towards said reflecting face from where it is reflected towards said exit face, and through said exit face to a light detecting device which continuously monitors said light; moving at least one of the optical fibres transversely with respect to the other until the light monitored by said light detecting device is a maximum; and permanently securing the abutting ends of the optical fibres together.

* * * * *